United States Patent
Alfattani et al.

(10) Patent No.: US 10,422,124 B1
(45) Date of Patent: Sep. 24, 2019

(54) BISTABLE COLLAPSIBLE COMPLIANT MECHANISMS AND SHAPE-CHANGING STRUCTURES THAT COMPRISE THEM

(71) Applicants: Rami A. Alfattani, Makkah (SA); Craig Lusk, Lutz, FL (US)

(72) Inventors: Rami A. Alfattani, Makkah (SA); Craig Lusk, Lutz, FL (US)

(73) Assignee: University of South Florida, Tampa, FL (US)

( * ) Notice: Subject to any disclaimer, the term of this patent is extended or adjusted under 35 U.S.C. 154(b) by 127 days.

(21) Appl. No.: 15/594,132

(22) Filed: May 12, 2017

Related U.S. Application Data

(60) Provisional application No. 62/335,427, filed on May 12, 2016.

(51) Int. Cl.
   *E04B 1/343*     (2006.01)
   *E04B 1/344*     (2006.01)
   *F16H 21/54*     (2006.01)

(52) U.S. Cl.
   CPC .......... *E04B 1/34357* (2013.01); *E04B 1/344* (2013.01); *F16H 21/54* (2013.01)

(58) Field of Classification Search
   CPC ............. E04B 1/34357; E04B 1/34384; E04B 9/0414; F16H 21/54
   USPC ........................................ 267/148
   See application file for complete search history.

(56) References Cited

U.S. PATENT DOCUMENTS

| | | | | |
|---|---|---|---|---|
| 3,407,558 A | * | 10/1968 | Resch | E04B 1/19 52/574 |
| 4,336,823 A | * | 6/1982 | Staiger | F16K 31/0606 137/270 |
| 4,635,683 A | * | 1/1987 | Nielsen | H01F 7/13 137/625.65 |
| 4,637,192 A | * | 1/1987 | Brown | E04H 12/18 428/12 |
| 4,773,445 A | * | 9/1988 | Visket | F16K 11/24 137/595 |

(Continued)

OTHER PUBLICATIONS

Jahedi, et al., "A novel bistable microelectromechanical mechanism utilizing socket joints", IMMR, IEEE, May 2005.

(Continued)

*Primary Examiner* — Bradley T King
*Assistant Examiner* — Mahbubur Rashid
(74) *Attorney, Agent, or Firm* — Thomas | Horstemeyer, LLP

(57) ABSTRACT

A bistable collapsible compliant mechanism including a first sub-mechanism comprising opposed first and second quaternary links and multiple binary links, each link being connected to at least two other links in the sub-mechanism, and a second sub-mechanism connected to the first sub-mechanism, the second sub-mechanism also comprising opposed first and second quaternary links and multiple binary links, each link being connected to at least two other links in the sub-mechanism, wherein the bistable collapsible compliant mechanism can be alternatively be placed in a stable extended orientation in which the bistable collapsible compliant mechanism has a trapezoidal shape and in a stable contracted orientation in which the bistable collapsible compliant mechanism has a polygonal spiral shape.

18 Claims, 18 Drawing Sheets

(56) References Cited

U.S. PATENT DOCUMENTS

| | | | | |
|---|---|---|---|---|
| 4,795,098 | A * | 1/1989 | Kirchner | F02M 51/0632 239/585.1 |
| 5,024,031 | A * | 6/1991 | Hoberman | E04B 1/3211 52/109 |
| 5,761,871 | A * | 6/1998 | Atake | E04B 1/32 52/109 |
| 5,915,677 | A * | 6/1999 | Yajima | F01N 1/006 267/161 |
| 5,924,492 | A * | 7/1999 | Kikuchi | A62C 37/12 137/72 |
| 6,215,081 | B1 | 4/2001 | Jensen | |
| 6,219,974 | B1 * | 4/2001 | Hoberman | A63F 9/088 446/478 |
| 6,401,404 | B1 * | 6/2002 | Fillipp | B44C 5/00 362/249.04 |
| 6,547,214 | B2 * | 4/2003 | Gregoire | F16K 17/048 251/58 |
| 6,668,849 | B2 * | 12/2003 | Onstenk | F04D 29/281 137/1 |
| 6,739,098 | B2 * | 5/2004 | Hoberman | E04B 1/32 135/131 |
| 6,983,924 | B2 * | 1/2006 | Howell | F16F 1/027 251/118 |
| 7,100,333 | B2 * | 9/2006 | Hoberman | E04B 1/3211 135/29 |
| 7,559,174 | B2 * | 7/2009 | Hoberman | E04B 7/166 52/66 |
| 7,984,728 | B2 * | 7/2011 | Wynn, Jr. | F02M 69/54 137/539 |
| 8,047,503 | B2 * | 11/2011 | Hirt | F16F 1/025 251/64 |
| 8,084,117 | B2 * | 12/2011 | Lalvani | B32B 3/266 428/135 |
| 8,584,456 | B1 * | 11/2013 | McKnight | H02N 10/00 310/307 |
| 8,669,514 | B2 * | 3/2014 | Kjartanson | A01C 7/105 250/221 |
| 8,689,514 | B1 * | 4/2014 | Sternowski | H01Q 1/288 52/635 |
| 8,876,094 | B1 * | 11/2014 | Ridgeway | F16F 1/34 267/160 |
| 9,709,793 | B1 * | 7/2017 | Seltzer | G02B 23/20 |
| 9,850,814 | B2 * | 12/2017 | Grogg | F02C 7/06 |
| 9,857,026 | B1 * | 1/2018 | Hoberman | E04B 7/107 |
| 2002/0112413 | A1 * | 8/2002 | Hoberman | E04B 1/3211 52/71 |
| 2010/0319270 | A1 * | 12/2010 | Slade | B64G 1/222 52/71 |
| 2012/0234508 | A1 * | 9/2012 | Lusk | B25J 9/08 160/236 |
| 2013/0180693 | A1 * | 7/2013 | Gomez | B23K 37/006 165/135 |
| 2013/0181000 | A1 * | 7/2013 | Miksovsky | A45F 3/20 220/780 |
| 2013/0340373 | A1 * | 12/2013 | Santiago Prowald | B64G 1/222 52/646 |
| 2016/0040828 | A1 * | 2/2016 | Henke | A47B 47/0008 52/633 |

OTHER PUBLICATIONS

Santer, et al., "Compliant multistable structural elements", International Journal of Solids and Structures, Elsevier, 45, 2008.
Parkinson, et al., "Optimization-Based Design of a Fully-Compliant Bistable Micromechanism", Proceedings of DETC'00, ASME 2000 Design Engineering Technical Conferences, 2000.
Jensen, et al., "Bistable Configurations of Compliant Mechanisms Modeled Using Four Links and Translational Joints", Journal of Mechanical Design, ASME, vol. 126, 2004.
Jensen, et al., "Design of two-link, In-Plane, Bistable Compliant Micro-Mechanisms", Transactions of ASME, vol. 21, Sep. 1999.
A. Hartmann and B. Hoffert, "SPACE-Saving Furniture Projects for the Home," Library Journal, vol. 124, No. 8, p. 107, 1999.
Zhang, et al., "Design of Compliant Bistable Mechanism for Rear Trunk Lid of Cars", International conference on intelligent robotics and applications, ICIRA 2011.
H. Su and L. M. McCarthy, "Synthesis of bistable compliant four-bar mechanisms using polynomial homotopy," Trans. ASME, J. Mechan. Design, vol. 129, p. 1094-1098, 2007.
J. Qiu, J. H. Lang and A. H. Slocum, "A curved-beam bistable mechanism," J. Microelectromech. Syst., vol. 13, p. 137-146, 2004.
M. A. Pucheta and A. Cardona, "Design of bistable compliant mechanisms using precision-position and rigid-body replacement methods," Mech. Mach. Theory, vol. 45, p. 304-326, 2010.
J. O. Jacobsen, B. G. Winder, S. P. Howell and S. P. Magleby, "Lamina emergent mechanisms and their basic elements," Journal of Mechanisms and Robotics 2, pp. 1-9, 2010.
S. E. Wilding, L. L. Howell and S. P. Magleby, "Spherical lamina emergent mechanisms," Mechanism and Machine Theory, vol. 49, p. 187-197, 2012.
Alqasimi, A., Lusk, C., Chimento, J., "Design of a Linear Bi-stable Compliant Crank-Slider-Mechanism (LBCCSM)," in Proceedings of the 2014 Design Engineering Technical Conferences & Computers and Information in Engineering Conference, Buffalo, 2014.
Alqasimi A., Lusk C., "Shape-Morphing Space Frame (SMSF) Using Linear Bistable Elements," in Proceedings of the 2015 Design Engineering Technical Conferences & Computers and Information in Engineering Conference, Boston, 2015.
J. M. Gattas and Z. You, "Geometric assembly of rigid-foldable morphing sandwich structures," Engineering Structures, vol. 94, p. 149-159, 2015.
L. L. Howell, A. Midha and T. W. Norton, "Evaluation of Equivalent Spring Stiffness for Use in a Pseudo-Rigid-Body Model of Large-Deflection Compliant Mechanisms," ASME Journal of Mechanical Design, vol. 118, No. 1, pp. 126-131, 1996.
T. S. Liu and C. C. Chou, "Type synthesis of vehicle planner suspension mechanism using graph theory," ASME Journal of Mechanical Design, vol. 115, No. 3, pp. 652-657, 1993.
L. T. Feng C. M., "A graph-theory approach to designing deployable mechanism of reflector antenna," Acta Astronautica, vol. 87, pp. 40-47, 2013.
P. Vladimir and E. Ekaterina, "Number structural synthesis and enumeration process of all possible sets of multiple joints for 1-DOF up to 5-loop 12-link," Mechanism and Machine Theory, vol. 90, pp. 108-127, 2015.
W. Jianing, L. Junlan, and Y. Shaoze, "Design of deployable bistable structures for morphing skin and its structural optimization," Engineering Optimization, pp. 745-762, 2014.
G. Petra, H. Sandra, I. Barbara, Ö. Kürsad, W. Rene and A. P. Maria, "Deployable structures for a human lunar base," Acta Astronautica, vol. 61, pp. 484-495, 2007.
C. Wen-Tung, Chen-Chou Lin and Long-long Wu, "A Note on Grashof's Theorem," Journal of Marine Science and Technology, vol. 13, No. 4, pp. 239-248, 2005.
R. L. Norton, Kinematics Fundamentals, Worcester: McGraw Hill, 2012.
Montalbano, Paul, Multistable Shape-Shifting Surfaces (MSSSs); Graduate Theses and Dissertations, Jan. 2012.

* cited by examiner

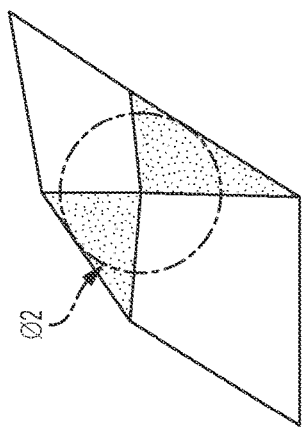
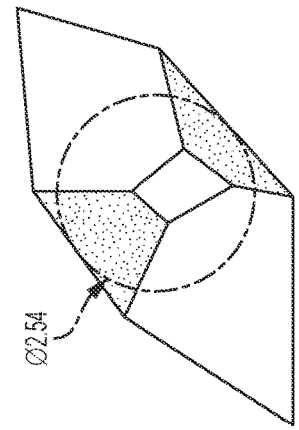
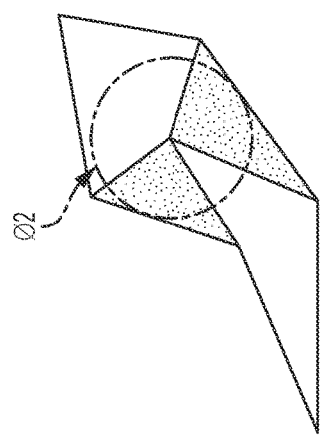
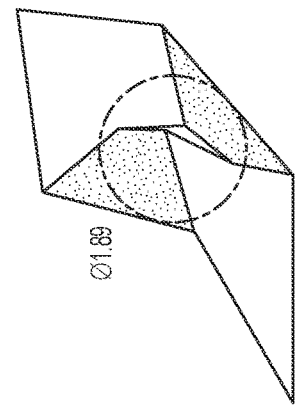
FIG. 7A
FIG. 7B
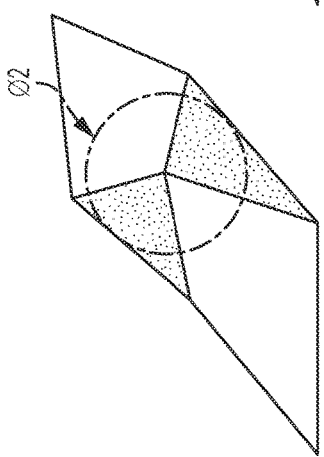
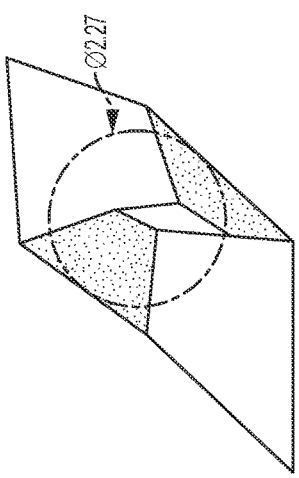

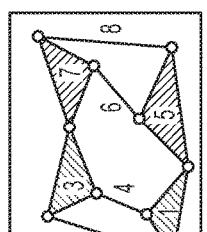
FIG. 9A
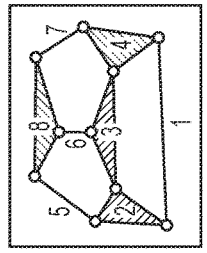
FIG. 9B
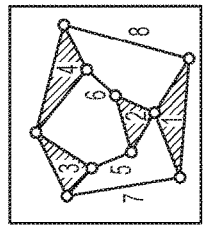
FIG. 9C
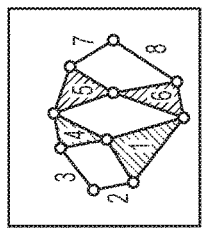
FIG. 9D
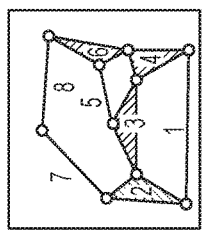
FIG. 9E
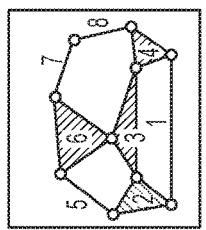
FIG. 9F
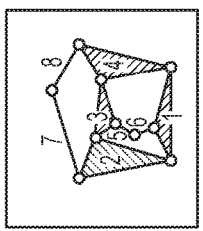
FIG. 9G
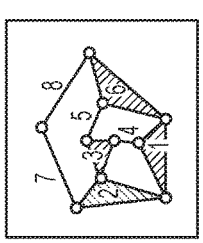
FIG. 9H
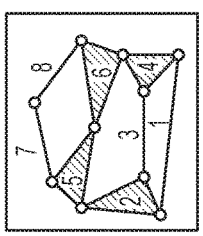
FIG. 9I
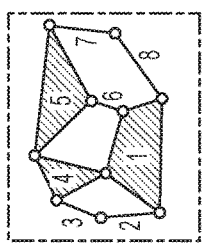
FIG. 9J
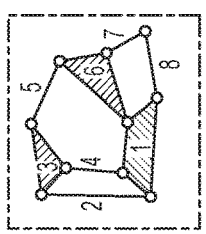
FIG. 9K
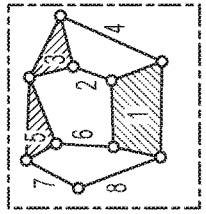
FIG. 9L
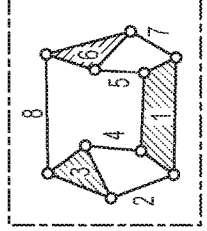
FIG. 9M
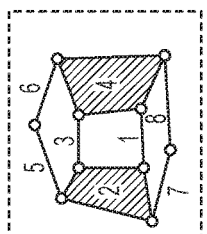
FIG. 9N
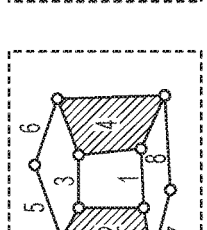
FIG. 9O
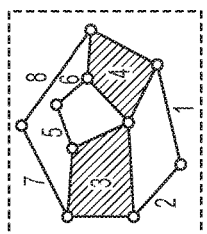
FIG. 9P
CATEGORY 1
CATEGORY 2
CATEGORY 3

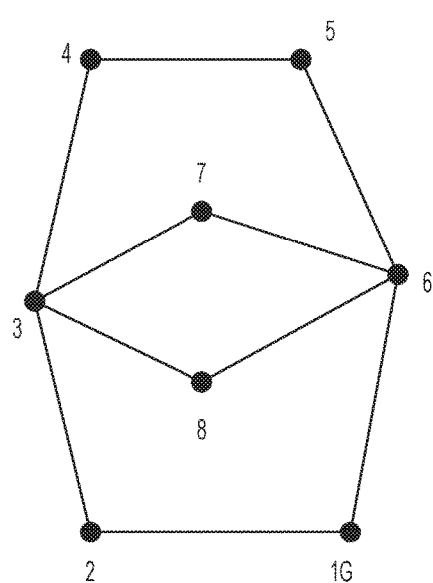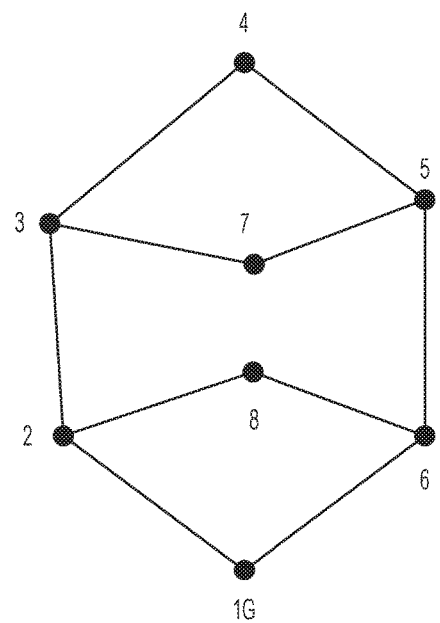
Graph of Mechanism 1          Graph of Mechanism 2
*FIG. 11A*          *FIG. 11B*

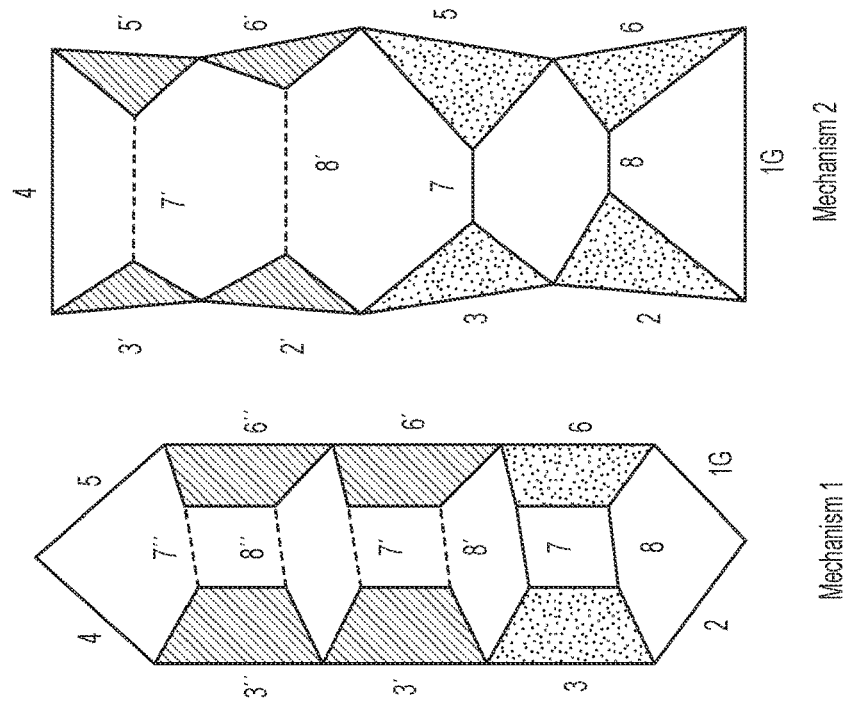
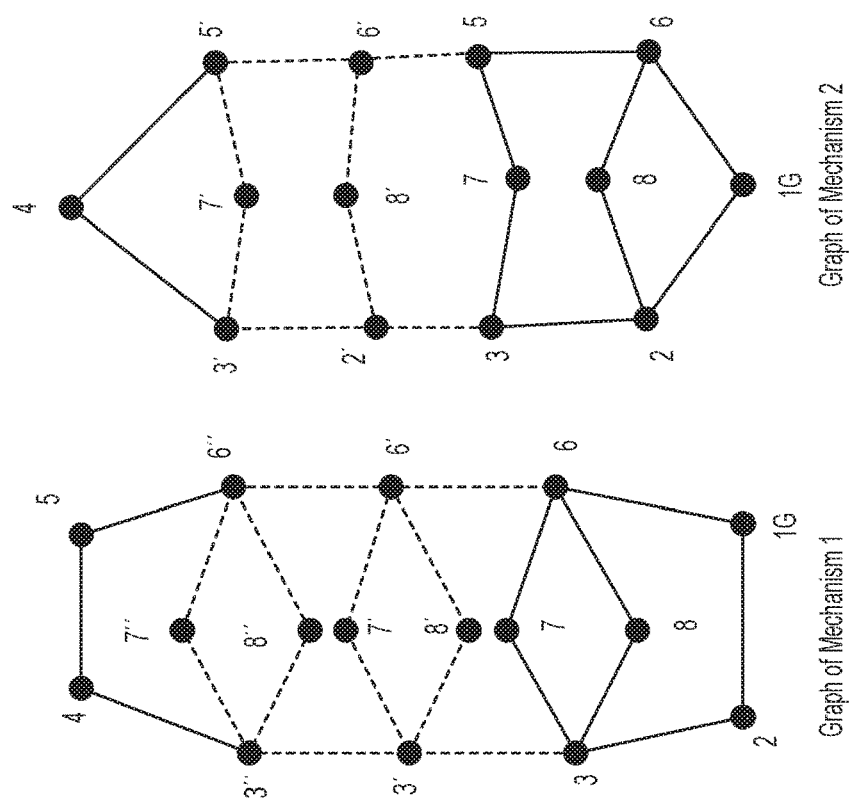
FIG. 12A
FIG. 12B

BISTABLE COLLAPSIBLE COMPLIANT MECHANISMS AND SHAPE-CHANGING STRUCTURES THAT COMPRISE THEM

CROSS-REFERENCE TO RELATED APPLICATION

This application claims priority to U.S. Provisional Application Ser. No. 62/335,427, filed May 12, 2016, which is hereby incorporated by reference herein in its entirety.

NOTICE OF FEDERALLY SPONSORED RESEARCH OR DEVELOPMENT

This invention was made with Government support under Grant No. CMMI-1053956 awarded by the National Science Foundation. The government has certain rights in the invention.

BACKGROUND

A compliant mechanism is a flexible mechanism that derives some or all its motion (mobility) from the deflection of flexible segments, thereby replacing the need for mechanical joints. It transfers an input force or displacement from one point to another through elastic body deformation. The absence or reduction of mechanical joints impacts both performance and cost. Advantages include reduced friction and wear, increased reliability and precision, and decreased maintenance and weight. Additional advantages over rigid-link mechanisms are reduction in number of parts, elimination of joint clearances, integral spring loading, and potential reductions in cost. Moreover, cost is also affected by reduced assembly time and, in most cases, because mechanical joints are not needed, the fabrication of such mechanisms can be produced from a single piece of material. Additionally, compliant mechanisms provide the designer with an effective way to achieve mechanical stability.

BRIEF DESCRIPTION OF THE DRAWINGS

For a fuller understanding of the invention, reference should be made to the following detailed description, taken in connection with the accompanying drawings, in which:

FIG. 7A depicts limitation of collapsing motion in a 6-bar mechanism.

FIG. 7B depicts the possibility of various collapsing motions for an 8-bar mechanism.

FIGS. 9A-9P depict 16 possible 1 degree of freedom sets resulting from Eq. (10) and (11). Category 1 represents nine configurations of Q=0, T=4, and B=4. Category 2 represents five configurations of Q=1, T=2, and B=5. Category 3 represents two configurations of Q=2, T=0, and B=6.

FIGS. 11A and 11B depict a graph configuration of two mechanisms from FIG. 9.

FIGS. 12A and 12B show repeating (polymerizing) the structure of the two mechanisms in FIG. 11. FIG. 12A is the graph representation and FIG. 12B is the mechanism representation.

FIG. 14A shows a first stable orientation forming a frustum shape and FIG. 14B shows a second stable orientation forming a polygonal spiral shape.

DETAILED DESCRIPTION

In the following disclosure, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

The present disclosure describes shape-changing structures that can be placed in a first, stable retracted orientation as well as in a second, stable extended orientation. In some embodiments, the shape-changing structure morphs from a planar shape to a frustoconical shape and incorporates multiple substantially identical bistable collapsible compliant mechanisms. Applications for such a structure include aerospace applications, traffic-safety reflectors, and space-saving furniture. Further, if such designs are manufactured in micro-scale, it is contemplated that they can provide additional useful functions, such as switches and relays.

Such structures and applications typically include a number of parts or mechanisms that may consist of links, springs, and switches, which can have high costs for manufacture, assembly, and maintenance. Compliant mechanisms offer advantages in these areas and can be bistable.

Collapsible Compliant Mechanisms

Figures 1A, 1B:
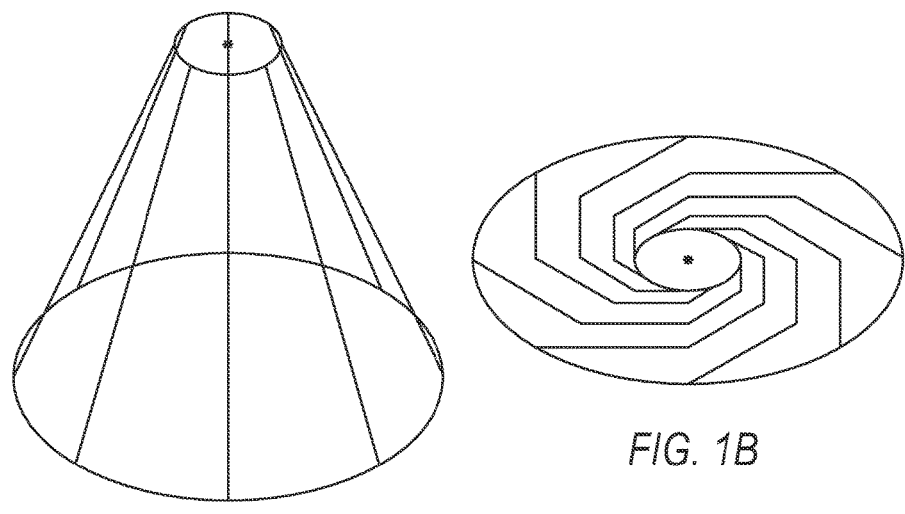
FIGS. 1A and 1B schematic views of a shape-changing structure in an extended orientation (FIG. 1A) and in a retracted orientation (FIG. 1B).

As shown in FIG. 1A, a frustum can be broken down into a number of generally planar sides that are combined to form a frustoconical shape. In order to compress such a frustum into a planar orientation, the planar sides of the frustum can be bent into polygonal spirals, as illustrated in FIG. 1B. In that figure, polygonal spirals are used because they can comprise straight segments that are compatible with rigid links in a mechanism. The design of the polygonal spirals is discussed herein. Also discussed are its interior and a mechanism for coordinating the degrees of freedom in the spirals.

Figure 2:
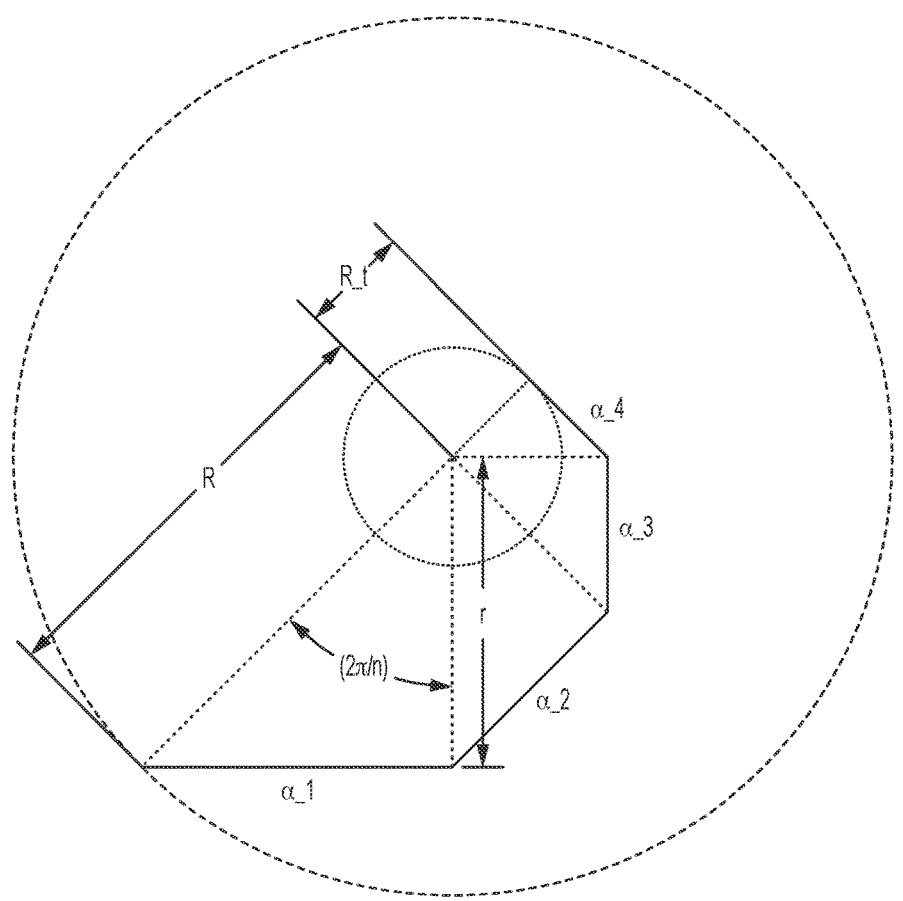
FIG. 2 depicts a polygonal spiral calculation and ratio with k=4 segments and n=8 sectors.

Polygonal spirals provide a constant ratio of the sides for a given initial radius (R) as shown in FIG. 2. The polygonal spiral is designed in a pattern that can be adjusted and modified with a constant ratio, as:

$$\frac{r_{i+1}}{r_i} = \frac{r_1}{R} = \cos\left(\frac{2\pi}{n}\right) \tag{1}$$

where R is the radius of the base of the spiral, $r_i$ is the distance from the center of a circle to the spiral corner, and n is the number of sectors of the spiral. The polygonal spiral has k segments. The length of the spiral can be calculated as the summation of all side lengths ($a_i$).

$$L = a_1 + a_2 + \ldots + a_k \tag{2}$$

$$L = a_1 * \left(\sum_{i=1}^{k} \cos^k\left(\frac{2\pi}{n}\right)\right) \quad i = 1, 2, 3, \ldots k \tag{3}$$

$$a_1 = R\sin\left(\frac{2\pi}{n}\right) \tag{4}$$

Figure 3:
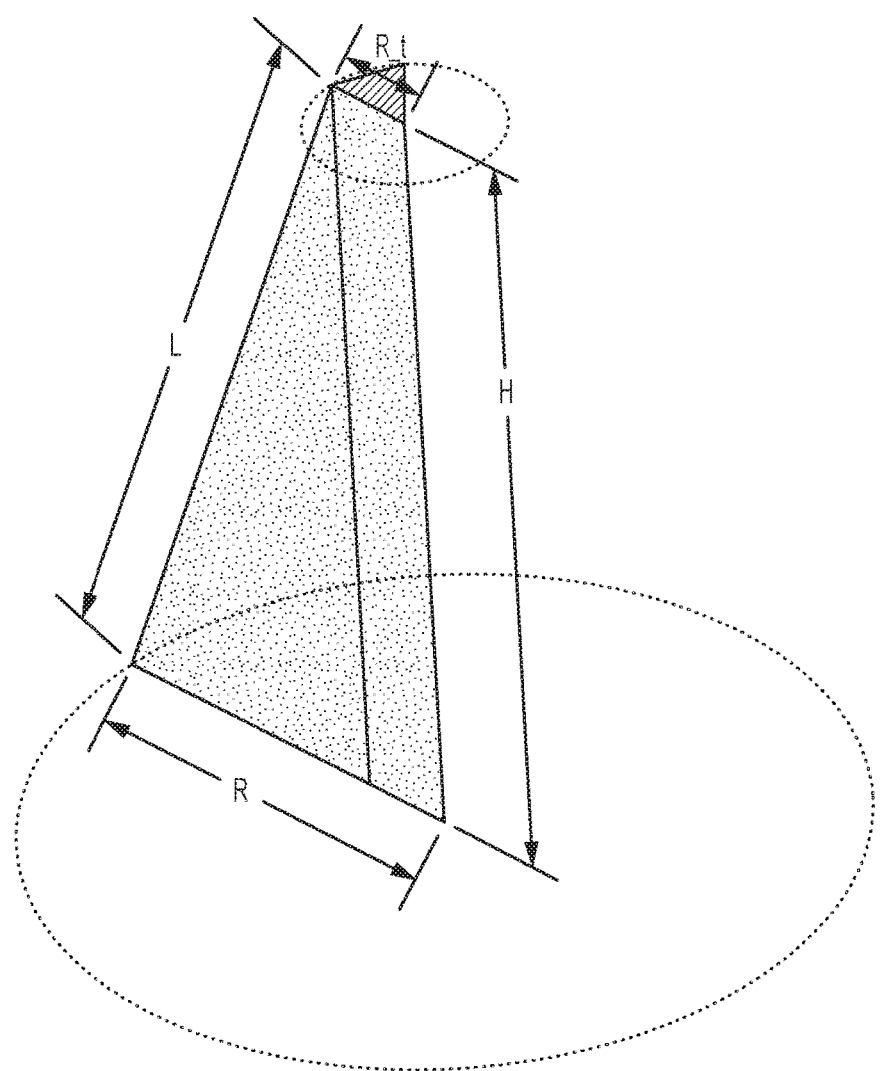
FIG. 3 depicts a slice of a polygonal frustum and measurement of a height thereof.

The polygonal spiral was chosen to terminate 180° from its origin on the outer radius. This means that each spiral passes through half the sectors n, so the number of segments k equals n/2. The length of spiral enables the calculation of the height of the frustum using the Pythagorean Theorem as shown in FIG. 3.

$$H^2 = L^2 - (R - R_t)^2 \tag{5}$$

where H is the height of the frustum and $R_t$ is the radius of the top of the frustum. In addition, the top surface of the frustum will appear on the planar position of the spirals as the spirals rotate 180°, creating a smaller circle inside. The top radius $R_t$ can be calculated by iterating Eq. (1) as:

$$\frac{R_t}{R} = \left(\frac{r}{R}\right)^{\frac{n}{2}} = \cos^{\frac{n}{2}}\left(\frac{2\pi}{n}\right) \tag{6}$$

This ratio shows that the frustum top surface is controlled by n when k=n/2, where increasing n increases the radius $R_t$. Solving for H in Eq. (5) using Eqs. (3), (4), and (6):

$$H = R * \left\{\left[\sin\left(\frac{2\pi}{n}\right) * \sum_{k=0}^{\frac{n}{2}-1} \cos^k\left(\frac{2\pi}{n}\right)\right]^2 - \left[1 - \cos^{\frac{n}{2}}\left(\frac{2\pi}{n}\right)\right]^2\right\}^{\frac{1}{2}} \tag{7}$$

It can be clearly seen that the height equation depends on the number of sectors and the outer radius, and the increase of sectors increases the height. However, the increase of sectors tends to increase the degrees of freedom per spiral. Moreover, there is not a large difference in the height of the frustum shape because the ratio of the spiral in Eq. (1) is diminished with the increase of sectors.

$$\text{Height Improvement} = \frac{H_{i+1} - H_i}{H_i} \tag{8}$$

TABLE 1

The improvement of height with the increase of sectors n.

| n | R | L | b | $R_t$ | H | % |
|---|---|---|---|---|---|---|
| 6 | 1 | 1.515544 | 1 | 0.125 | 1.29731 | |
| 8 | 1 | 1.81066 | 0.765367 | 0.25 | 1.648026 | 0.27 |
| 10 | 1 | 2.011057 | 0.618034 | 0.346 | 1.866693 | 0.13 |
| 12 | 1 | 2.157952 | 0.517638 | 0.421 | 2.020647 | 0.08 |
| 14 | 1 | 2.269888 | 0.445042 | 0.481 | 2.136045 | 0.05 |
| 16 | 1 | 2.358878 | 0.390181 | 0.530 | 2.226137 | 0.04 |

Figure 4:
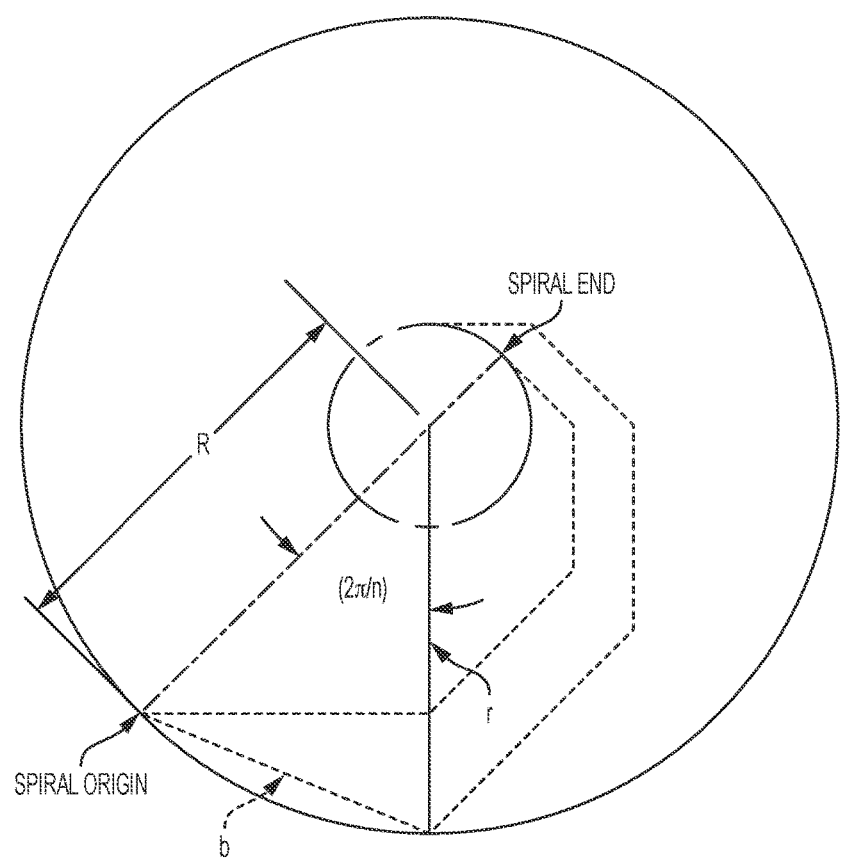
FIG. 4 depicts a sector calculation for a polygonal spiral with n=8 sectors.
Figure 5:
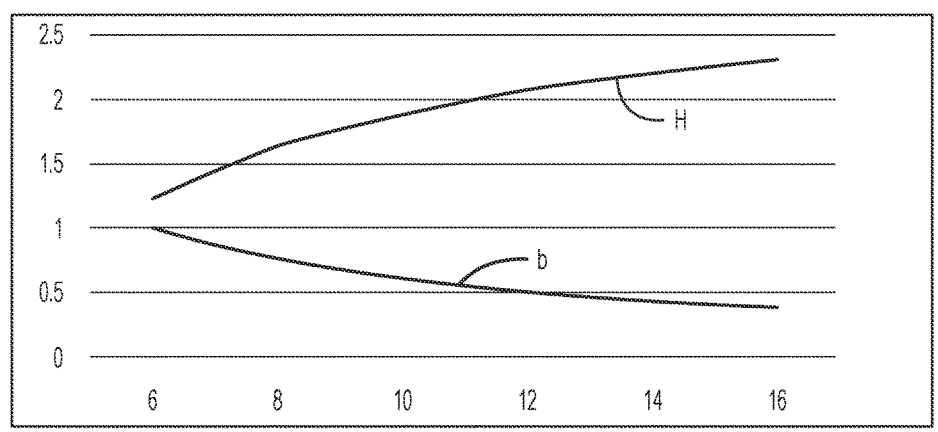
FIG. 5 depicts example collapsible compliant mechanism design parameters, i.e., the height (H) and the sector width (b), as a function of the number sectors and the height of different numbers of n and b.

Table 1 above shows the parameters used for the frustum structure design. It can be seen that the height improvement has diminishing improvement with increasing sectors. Besides, as the number of sectors increases, the sector width b in FIG. 4 reduces:

$$b = 2R^* \sin\left(\frac{\pi}{n}\right) \tag{9}$$

As the sector width b becomes smaller, the design of the shape-changing interior mechanism becomes more challenging, although still feasible.

Design Criteria

In some embodiments, it is desirable that the interior of the polygonal spiral be a one degree of freedom (DoF) compliant mechanism, whose PRBM (pseudo-rigid-body model) is a 1-DoF mechanism that can fit the two stable orientations. Each sector n can be designed as an independent mechanism and then coupled at the inner and outer circles (i.e., the top and the bottom of the frustum). Because the design is axisymmetric, the motion of the left side of each sector should correspond to its right side, i.e., the sides have equal lengths and rotations. This design has k=4 segments without internal links. Its minimum design is a 10-bar mechanism (see the dotted lines in FIG. 4). There are 230 possible 10-bar mechanisms with 1-DoF. As this is a large number of possibilities from which to begin the type syntheses, the inventors considered subdividing the sector and coupling the resulting mechanisms.

Figure 6A:
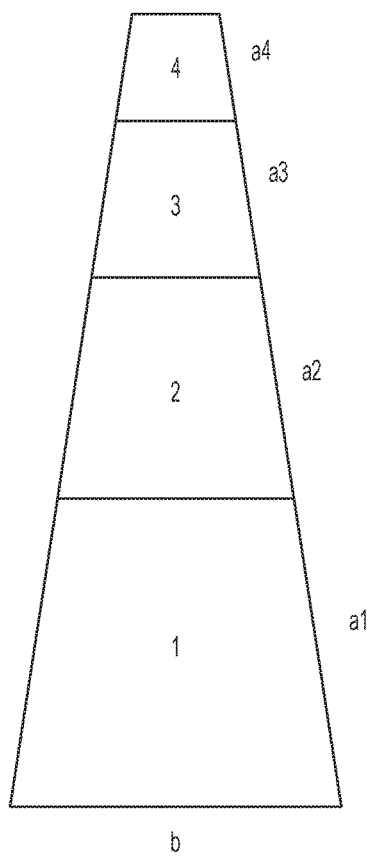
FIGS. 6A and 6B depict an embodiment of a single sector of a polygonal spiral (n=4) comprising repeatable four-bar elements with constant ratio between the two positions.
Figure 6B:
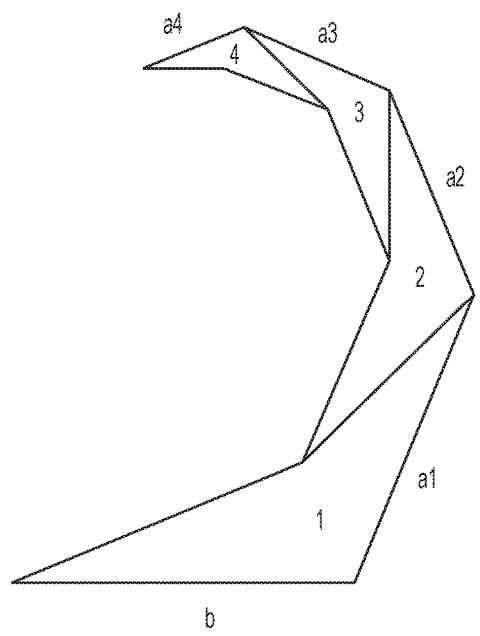

The polygonal spiral has a glide-translational scaling symmetry (GTS), as depicted by FIGS. 6A and 6B. As shown in these figures, a dart-shaped quadrilateral 1 has GTS symmetry with quadrilateral 2, which has the same symmetry with quadrilateral 3, and so forth. As a result, each quadrilateral of the design can be independently designed. However, because each such design should have a least one-degree of freedom, having four independently designed sectors results in a minimum of four degrees of freedom per sector. Fortunately, a similar scaling applies in the trapezoidal shape seen in FIG. 6A, even though the glide-translation is different. To limit the degrees of freedom in each sector, designs were chosen that couple the motion of the quadrilateral as is shown in FIG. 6. Then 6-bar, 8-bar, and designing two sectors at once was evaluated with the objective of learning how to couple all four segments together.

As shown in FIG. 7A, when 6-bar design is used, the coupling between sectors' subdivisions is too rigid and the distance between the left and right sides does not compress. FIG. 7A shows that the left and right sides rotate with respect to each other but are forced to maintain a constant radial distance. The 8-bar design shown in FIG. 7B is a more effective coupling because it enables relative translation and enhanced compression and expansion of the sector sides. This shows a variety of possible motions of the mechanism and reveals that it can have a different radii circle between the bases of the quaternary links.

Kutzbach's equation was used to present the mobility of the kinematic chain of linkages:

$$M=3(L-1)-2J_1-J_2 \quad (10)$$

where M=degrees of freedom, L=number of links, $J_1$=number of lower pairs or 1-DoF full joints, and $J_2$=number of higher pairs or 2-DoF half joints.

Because the kinematic chain is designed for a compliant mechanism, all joints are considered to be revolute joints or lower pairs and there will not be any higher pairs. Substituting M=1, L=8, and $J_2$=0 into Eq. (9) gives $J_1$=10. Based on this calculation, the 8-bar mechanism should have 10 lower pairs for one degree of freedom. Many types of links can produce a mechanism but to reduce the complexity, only binary (B, order=2), ternary (T, order=3), and quaternary (Q, order=4) links and no multiple joints are considered. The total number of links can be:

$$B+T+Q=L=8 \quad (11)$$

and the number of joints=order of links multiplied by the number of links of that order:

$$\frac{2B+3T+4Q}{2}=J_1=10 \quad (12)$$

Figure 8:
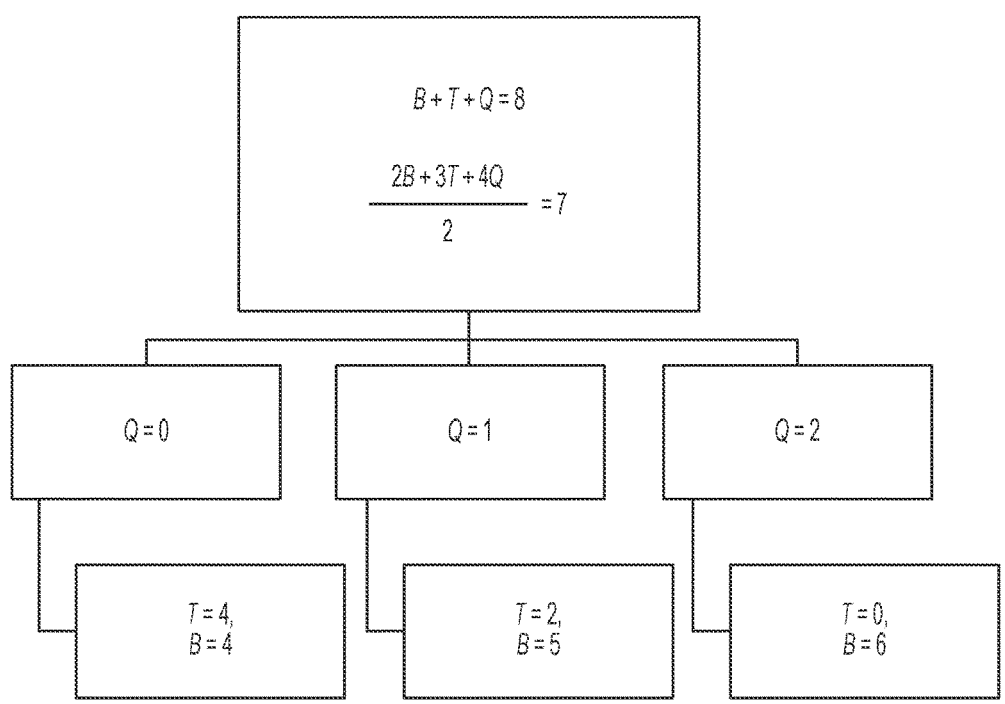
FIG. 8 depicts three kinematic categories when Q=0, 1, and 2 are obtained from Eqs. (10) and (11). Category 1 (Q=0) leads to T=4, B=4, and can represent 9 linkage chains. Category 2 (Q=1) leads to T=2, B=5, and can represent 5 linkage chains. Category 3 (Q=2) leads to T=0, B=6, and can represent 2 linkage chains.

Thus, the maximum number of quaternary links would be two. The result is presented in three categories for Q=0, 1, and 2, as shown in FIG. 8.

There are 16 types of 1-DoF mechanisms identified in FIGS. 9A-9P. In these figures, FIG. 9A shows mechanism a, FIG. 9B shows mechanism b, and so on. Each mechanism has been categorized as pertaining to categories 1, 2, or 3. The kinematic chains in FIG. 9 were evaluated based on the following criteria:
 1. The links in the outer loops should be an even number. This provides parallel links, which is suitable for the spiral design and rules out mechanisms c, f, g, h, i, j, and k.
 2. The number of ternary and quaternary links should be even to ensure the symmetry of the mechanism, otherwise, it will increase the complexity of the design. This rules out all of the mechanisms of category 2 (i.e., mechanisms j-n).
 3. The mechanism should have symmetric loops that can produce a repeatable pattern in the design. This rules out mechanisms e, f, and h.
 4. The mechanism loops should be collapsible, thus the ternary and quaternary cannot be directly connected. Otherwise, the design will have a limited range of motion as described for a six-bar in FIG. 7. This rules out mechanisms b, d, and p.

Each of the 16 mechanisms were evaluated based on these criteria. Category 2 (5 out of 16) of FIG. 9 was ruled out because it did not pass criteria 2. The remaining mechanisms were screened for the design criteria and only two mechanisms passed the design criteria. These mechanisms are mechanisms o and a, which are identified in FIGS. 10A and 10B as mechanisms 1 and 2, respectively.

Graph Theory

Figure 10A:
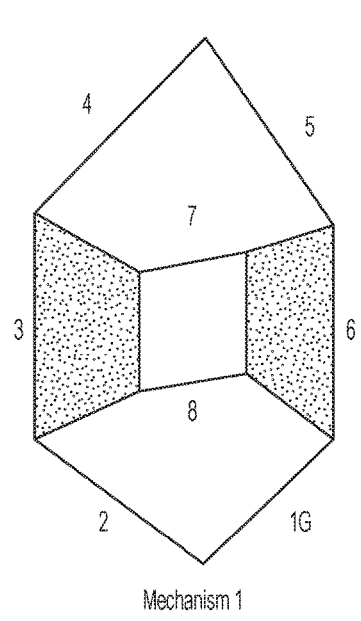
FIGS. 10A and 10B depict two one degree of freedom mechanisms that pass all design criteria. Mechanism 1 is composed of Q=2 and B=4. Mechanism 2 is composed of T=4 and B=4.
Figure 10B:
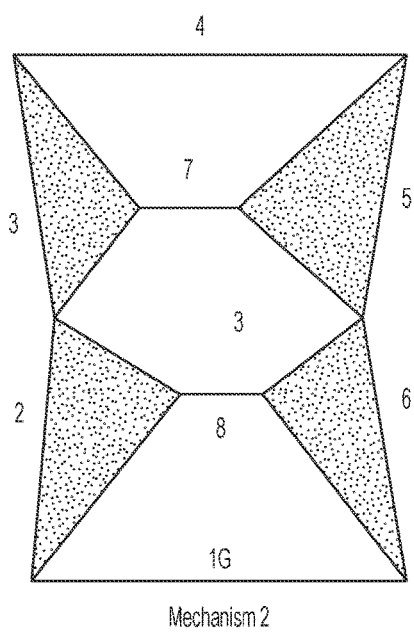

Graph theory was used to assist in the type synthesis of the interior of the polygonal spiral. The graphs of the two candidate mechanisms shown in FIGS. 10A and 10B are shown in FIGS. 11A and 11B, respectively. In FIGS. 11A and 11B, links in the mechanism become vertexes in the graph, and joints become edges.

Graph theory shows a symmetry in the connection between the links that enables extension of the mechanism, as shown in FIG. 12A for mechanisms 1 and 2. This extension of the mechanism, by adding similar segments, is analogous to the process of polymerization in chemistry, in which single building blocks or fundamental units (monomers) are combined to useful longer chains (polymers). Such polymerized mechanisms that do not change their mobility are useful in the construction of deployable structures, such as those used in the aerospace industry. This provides a pattern of mechanism arrangement that increases the number of segments and each segment can be dependently scaled based upon the previous segment.

In FIGS. 12A-12B, the repeated vertexes in the graph, which extend mechanism 2, show an increase in mobility. By transferring the graph back to the mechanism state as in FIG. 11 (mechanism 2), the result of Eq. 9 for [L=14, $J_1$=18, $J_2$=0] gives M=3 DoF, which cannot easily be used as repeating pattern. Therefore, only mechanism 1 passes all design criteria and, therefore, is a desirable design for the collapsible compliant mechanism, although other designs are discussed herein as well.

In designing the mechanism, a parametric computer-aided design (CAD) program was used to achieve the design goal in less computational time. Parametric CAD can provide clear visualization of the design approach. It allows kinematic chains and structure properties, such as displacement, to be straightforwardly analyzed. In some embodiments, the two positions of the 8-bar mechanism can be considered to be the main aspects of the design. Accordingly, it can be a goal of the design process to identify the initial and the final orientations of the design for synthesis of the 8-bar mechanism using parametric CAD.

Figure 13A:
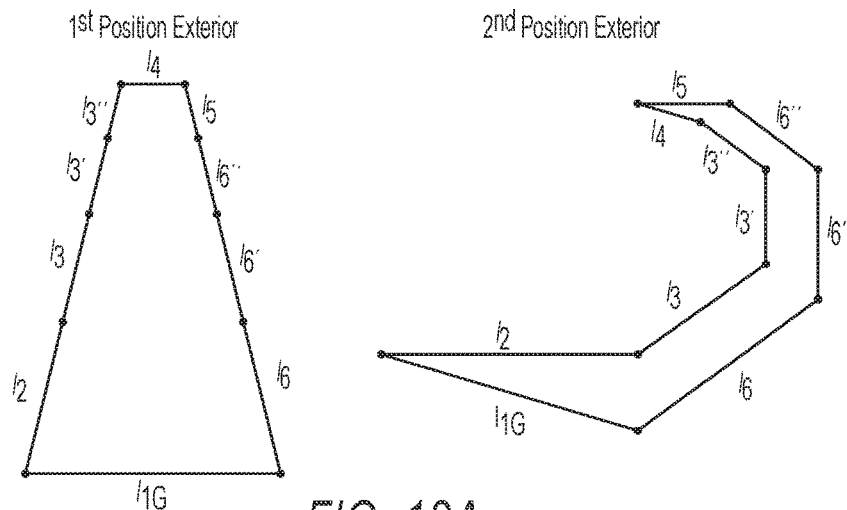
FIGS. 13A-13C depict the translation process from the selected 8-bar kinematic chain to the final mechanism. Parametric CAD was used to apply the exterior constraints (FIG. 13A), the exterior scheme of the selected 8-bar kinematic chain (FIG. 13B), and the final two positions part (FIG. 13C).
Figure 13B:
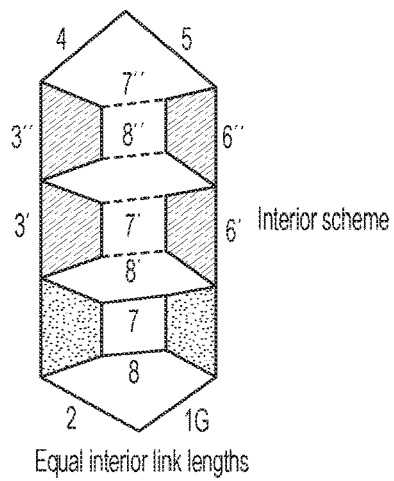

SOLIDWORKS™ was used for the translation of the extended 8-bar in FIG. 13A by setting the design constraints. The exterior links lengths in both the first and second orientations are equal and have fixed locations. The quaternary links keep the same shape and dimensions throughout the translation, which requires having constant angles between their four sides, as shown in FIG. 13B. While all constraints are being applied, SOLIDWORKS™ does not keep all interior joints in the internal spacing. It is possible that after all constraints are applied, the interior links may protrude constrained outside the designed exterior and links interfere each other. However, by adjusting one angle of the quaternary links of the first orientation, where it is linked to the corresponding angle in the second orientation using the link value option, allows one to adjust the angle value until all joints and links fit inside the internal spacing without interference of the links, as shown in FIG. 13C.

Bistability of a mechanism is a behavior that enables the mechanism to be stable in two different orientations. Therefore, a bistable mechanism can have two stable orientations in which no external forces are needed to maintain either of the orientations. Compliant mechanisms have the ability to store energy and, therefore, are apt for the construction of bistable mechanisms.

Figure 13C:
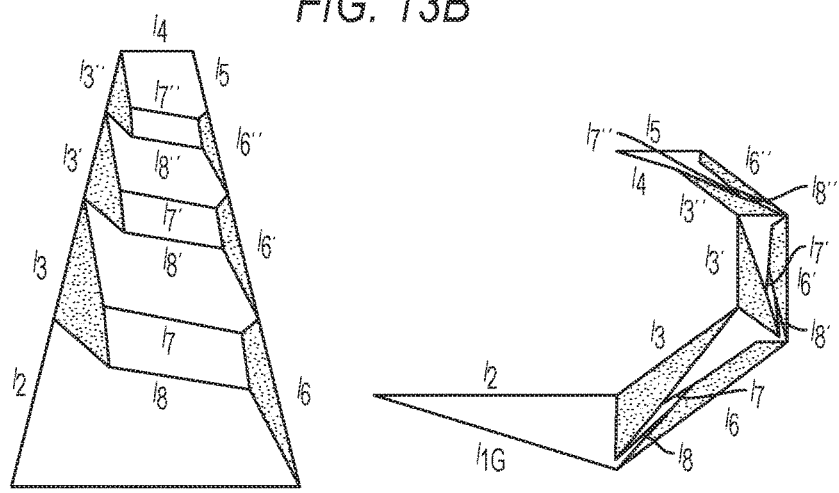

The mechanism in FIG. 13C is a collapsible compliant mechanism designed with minimal potential energy since it has only pivots, joints, and short links. The mechanism of FIG. 13C, however, is not a bistable mechanism that can be placed in two different stable orientations. A bistability link that dominates the potential energy curve can be added to the mechanism to render it bistable. Such a bistability link forces some of the links to bend to accommodate the tension or compression of the added link when moving between the two stable orientations. As a result, the bistability link gains potential energy when the mechanism is in an unstable position between the two stable orientations, and it loses potential energy when the mechanism is in one of the stable orientations. In some embodiments, the bistability link can be positioned in one of the two outer (e.g., top or bottom) loops of the 8-bar mechanism so it does not interfere with the repeating pattern.

Figure 14A:
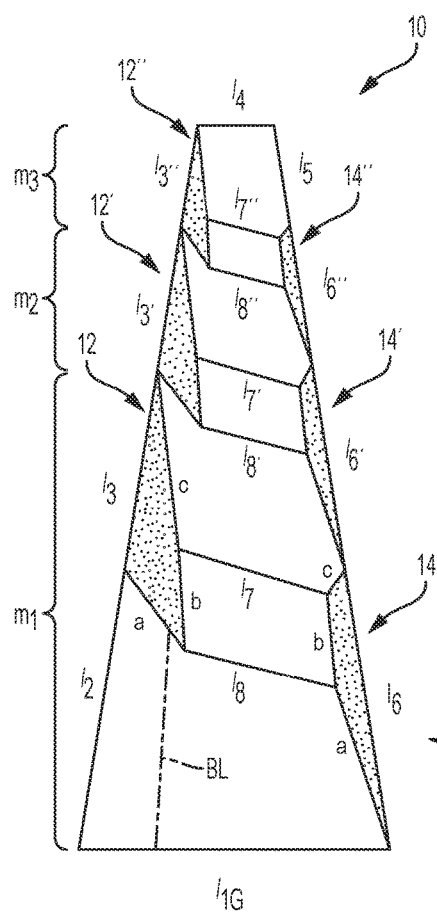
FIGS. 14A-14B depict an embodiment of a bistable collapsible compliant mechanism.
Figure 14B:
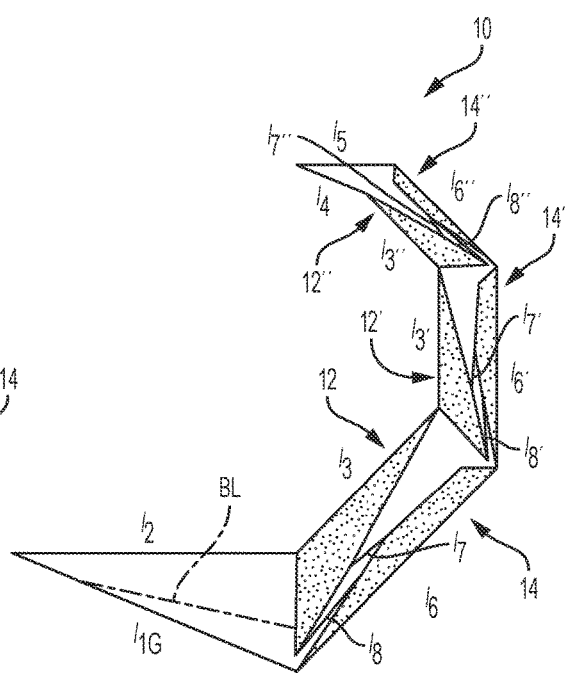

FIG. 14 illustrates an example bistable collapsible compliant mechanism 10 in accordance with the above discussion. This mechanism 10 is similar to the mechanism shown in FIG. 13, but includes a bistability link BL that enables the mechanism to be alternatively placed in one of two different stable orientations, i.e., an extended or expanded orientation (FIG. 14A) and a retracted or collapsed orientation (FIG. 14B). As is shown most clearly in FIG. 14A, the mechanism 10 includes three sub-mechanisms $m_1$, $m_2$, $m_3$ that are similar in configuration and connected to each other in series. In the series, each sub-mechanism is smaller than the previous sub-mechanism. More particularly, $m_2$ is smaller than sub-mechanism $m_1$ and sub-mechanism $m_3$ is smaller than sub-mechanism $m_2$. Because of this, the mechanism 10 forms a trapezoidal shape in the extended orientation in which the base of the trapezoid is parallel with the top of the trapezoid, but the base is larger than the top.

With further reference to FIG. 14A, each sub-mechanism $m_1$, $m_2$, $m_3$ comprises multiple links that are connected together at their ends or corners to other links in the sub-mechanism. In the illustrated embodiment, sub-mechanism $m_1$ (the largest of the three sub-mechanisms) comprises two opposed quaternary links 12 and 14. Each quaternary link 12, 14 is a quadrilateral link having four sides (none of which are parallel to each other) and four corners. As shown in the figure, quaternary link 12 comprises sides a, b, c, and $l_3$ (i.e., a side that forms an outer "link" of the sub-mechanism) and quaternary link 14 comprises sides a, b, c, and $l_6$. The sub-mechanism $m_1$ further includes multiple linear binary links, including binary links $1_1G$, $l_2$, $l_7$, and $l_8$.

As is apparent from FIG. 14A, binary link $1_1G$ (the "ground" link), which forms both the base of the sub-mechanism $m_1$ and the bistable collapsible compliant mechanism 10, is connected at its first (left) end to a first (bottom) end of binary link $l_2$ and is connected at its second (right) end to a bottom outer corner of quaternary link 14. Binary link $l_2$ is connected at its second (top) end to a bottom outer corner of quaternary link 12. Binary link $l_7$ is connected at its first (left) end to a top inner corner of quaternary link 12 and is connected at its second (right) end to a top inner corner of quaternary link 14. Finally, binary link $l_8$ is connected at its first (left) end to bottom inner corner of quaternary link 12 and is connected at its second (right) end to a bottom inner corner of quaternary link 14. In the above description, directions/positions such as left, right, top, and bottom are used to identify these directions/positions in the context of FIG. 14A. As will be appreciated by a person having ordinary skill in the art, if the mechanism 10 were rotated or inverted, these directions would change and, therefore, are not absolute. In addition, it is noted that, in the above description, each quaternary link is defined as having four corners, including a top outer corner, a bottom outer corner, a top inner corner, and a bottom inner corner. The terms "inner" and "outer" in this context refer to the location of the corner in terms of its position within the sub-mechanism $m_1$, as well as the mechanism 10 as a whole. Accordingly, as can be appreciated from FIG. 14A, "outer" corners are located along an outer edge of the mechanism 10, while "inner" corners are located within the interior space defined by the outer edges of the mechanism.

The configuration described above is repeated in each of sub-mechanisms $m_2$ and $m_3$, except that these sub-mechanisms do not include binary links $1_1G$ and $l_2$. Corresponding links in sub-mechanism $m_2$ are identified with corresponding letters/numbers with a prime (') added, and corresponding links in sub-mechanism $m_3$ are identified with corresponding letters/numbers with a double prime (") added. Notably, each link in sub-mechanism $m_2$ is smaller than its corresponding link in sub-mechanism $m_1$ and each link in sub-mechanism $m_3$ is smaller than its corresponding link in sub-mechanism $m_2$. A further distinction between the sub-mechanisms is that, unlike sub-mechanisms $m_1$ and $m_2$, sub-mechanism $m_3$ further comprises binary links $1_4$ and $1_5$. As shown in FIG. 14A, binary link $1_4$ is connected at its first (left) end to the top outer corner of quaternary link 12" and is connected at its second (right) end to a second (top) end of binary link $1_5$. Binary link $1_5$ is connected at its first (bottom) end to a top outer corner of quaternary link 14".

It is further noted that the sub-mechanisms $m_1$, $m_2$, $m_3$ are connected to each other with the outer corners of their quaternary links. In particular, the top outer corner of quaternary link 12 is connected to the bottom outer quaternary link 12' and the top outer corner of quaternary link 14 is connected to the bottom outer quaternary link 14'. In similar manner, the top outer corner of quaternary link 12' is connected to the bottom outer quaternary link 12" and the top outer corner of quaternary link 14' is connected to the bottom outer quaternary link 14".

In the illustrated embodiment, the bistability link BL is connected at its first (bottom) end to an intermediate point between the two ends of binary link $1_1G$ and is connected at its second (top) end to an intermediate point between the bottom outer and bottom inner corners of quaternary link 12.

FIG. 14B shows the bistable collapsible compliant mechanism 10 in the retracted orientation. When a suitable compressible force is applied to one or both of the top and base of the mechanism 10 (such that the distance between them is reduced), the mechanism collapses and transitions from the trapezoidal shape shown in FIG. 14A to a polygonal spiral shape shown in FIG. 14B. The polygonal spiral shape can be described as a "claw" shape as it comprises a relatively wide base that simultaneously tapers and curves to ultimately form a sharp tip as does an animal (e.g., cat) claw. As shown in FIG. 14B, the links $l_2$ and $l_5$ are generally parallel to each other, as are the outer edges of $l_3$ and $l_6$ of the opposed quaternary links 12 and 14 (same for $l_3'$ and $l_6'$ of links 12' and 14', and for $l_3''$ and $l_6''$ of links 12'' and 14'').

As is apparent from comparison between FIGS. 14A and 14B, each of the links has the same configuration and dimension in both stable orientations. It is noted, however, that one or more of the links may slightly deform as the mechanism 10 is transitioned from one state to the other. This can be achieved by constructing the links out of a material that enables the links to flex to a small degree. In such a case, the links could be described as being substantially rigid, which, as used herein, means generally rigid but capable of minor deformation in dimensions that are only a small fraction of the dimensions of the lengths, or lengths of the sides, of the links.

Each of the links is connected to at least two other links with a flexible hinge. Although such a hinge can comprise an independent mechanical hinge that is used in the construction of the bistable collapsible compliant mechanism 10, in some embodiments the mechanism 10 is unitarily formed from a single piece of material such that the hinges comprise flexible living hinges that are composed of the same material as the links but thinner so as to be capable of easily bending and/or deforming to enable the mechanism to be alternately expanded and contracted. In some embodiments, the mechanism 10 is made of a material, such as a polymer, that enables the mechanism to alternately be cycled from the extended orientation to the retracted orientation and back multiple times without failing.

Design Prototype

Figures 15A, 15B:
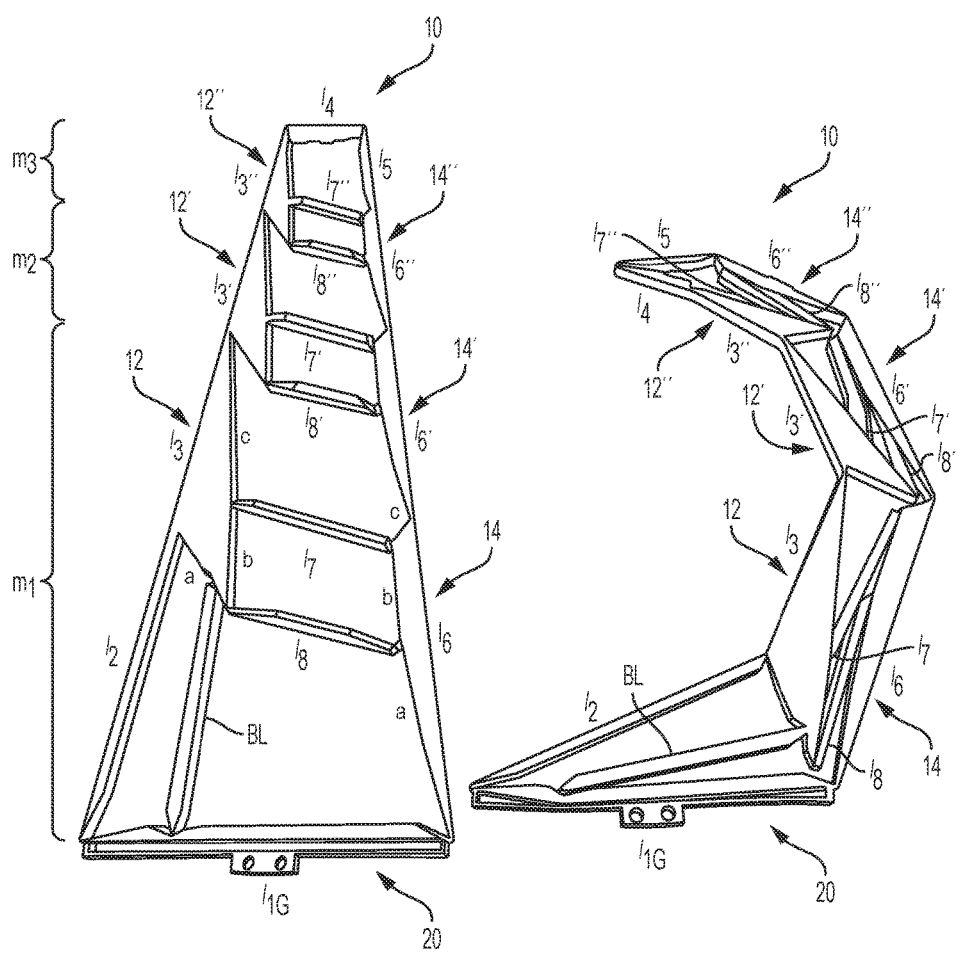
FIGS. 15A and 15B depict a bistable collapsible compliant mechanism prototype made of ⅛ inch thick polypropylene material.

Prototype bistable collapsible compliant mechanisms were fabricated based upon the design shown in FIG. 14. One such prototype mechanism 10 is shown in FIG. 15 (FIG. 15 uses the same reference lettering/numbering scheme as FIG. 14 for clarity). The prototype mechanisms 10 were fabricated to have a base radius of R=150 mm. The parameters of the prototype mechanisms 10 were derived as described above and are identified in Table 2 below. These parameters can be used to represent the first and second orientations of a sector and all prime link lengths by multiplying the unprimed values by the spiral ratio (once for the single primes, twice for the double primes). In the design of FIG. 14 and the prototype of FIG. 15, the 8-bar mechanism is formed of repeating pattern to satisfy the design parameters. Since n=8, the number of repeating patterns (P) can be calculated as:

$$P = \frac{n}{2} - 1 \quad (13)$$

In the design of FIG. 14 and the prototype of FIG. 15, P=3.

TABLE 2

| Design parameters (mm) for n = 8 and R = 150mm. | | | | | | |
|---|---|---|---|---|---|---|
| n | $a_i$ | R | L | b | $R_r$ | H |
| 8 | 4 | 150 | 271.59 | 114.80 | 37.5 | 247.20 |
| $L_1G$ | $L_2$ | $L_7$ | $L_8$ | $L_3$ | $L_3a$ | $L_3b$ |
| 114.8 | 106.07 | 58.88 | 58.11 | 75 | 37.48 | 37.28 |
| $L_3c$ | $L_6$ | $L_6a$ | $L_6b$ | $L_6c$ | BL | Spiral Ratio |
| 67.67 | 106.07 | 68.21 | 35.3 | 11.86 | 82.19 | 0.707 |

The prototype bistable collapsible compliant mechanisms 10 were laser cut from a ⅛" thick polypropylene co-polymer material. As is apparent from FIGS. 15A and 15B, the points at which the various links connect to each other comprised relatively small amounts of material (polypropylene co-polymer in this case) as compared to the bodies of the links. With such a configuration, flexible living hinges were formed that enable the links to pivot relative to each other without significant flexing or deforming of the links.

Figure 16:
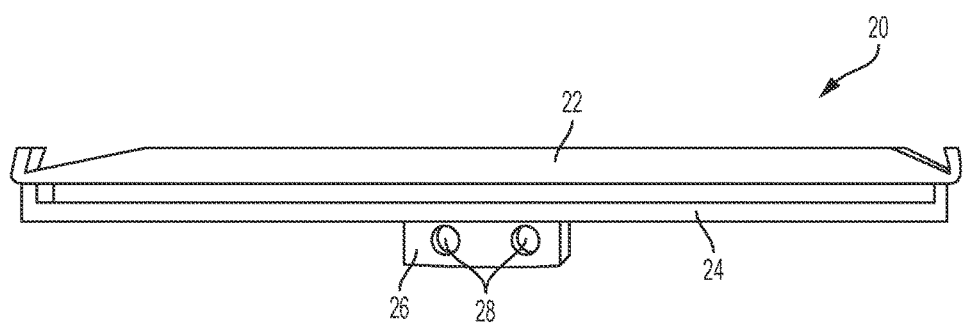
FIG. 16 depicts an embodiment of a twisting link that can connect the bistable collapsible compliant mechanism of FIG. 15 to a base.

As shown in FIG. 15, each prototype bistable collapsible compliant mechanism 10 included a twisting link 20. The twisting links 20 can be used both to attach the mechanism 10 to a base of a shape-changing structure and to enable the mechanism to pivot relative to the base (see FIG. 18). One such twisting link 20 is shown in FIG. 16. As shown in this figure, the twisting link 20 comprises an elongated beam 22 that is attached at each end to an end of an elongated base member 24. Notably, the beam 22 can be the ground link $L_1G$ of the mechanism 10 (see FIG. 15). As the beam 22 and the base member 24 are only attached to each other at their ends, and because the attachment points comprise relatively little material as compared to the beam and base member, the beam and base member can be twisted relative to each other. With further reference to FIG. 16, a mounting flange 26 extends from the base member 24 and includes openings 28 through which fasteners can pass for the purpose of attaching the twisting link 20, and therefore its associated mechanism 10, to the base.

Figure 17:
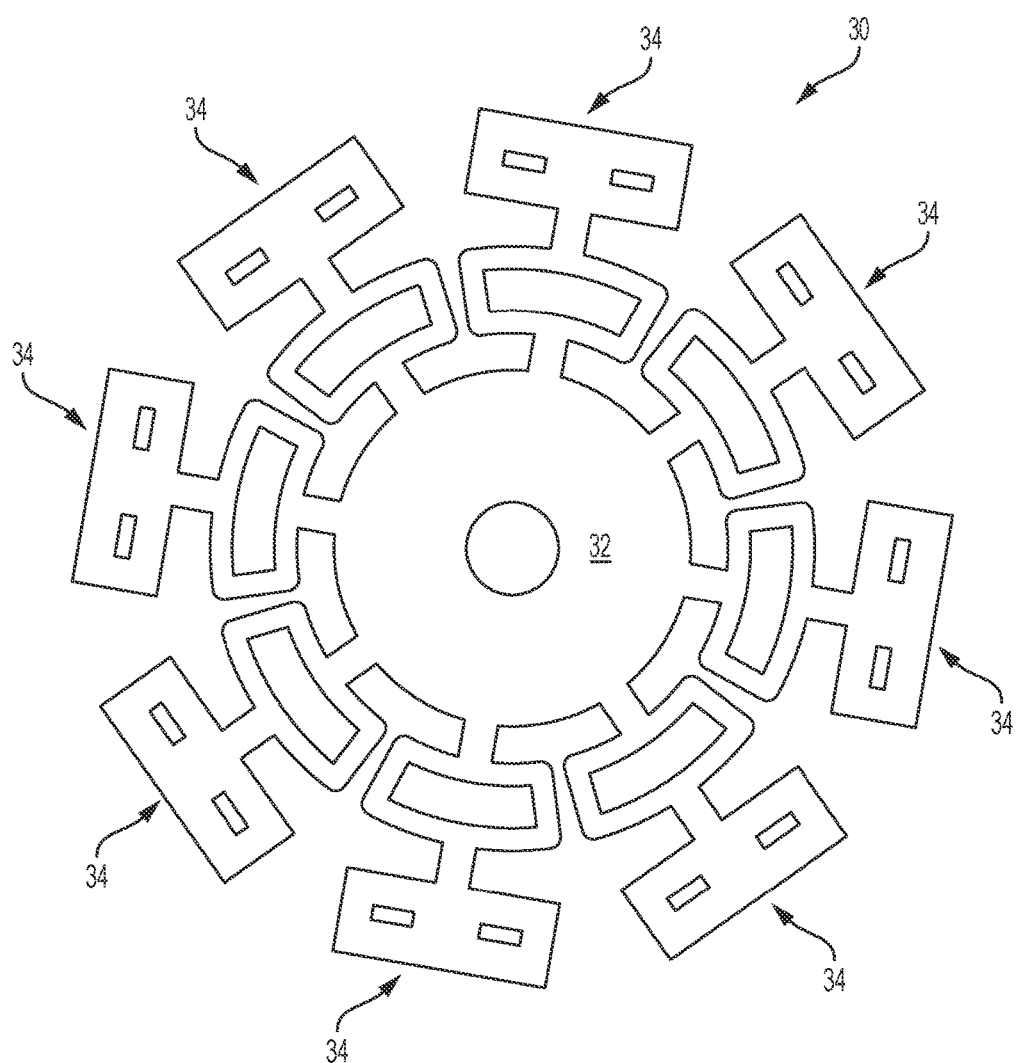
FIG. 17 shows an embodiment of a top that is formed of a 1/16 inch thick polypropylene material.

Illustrated in FIG. 17 is a top 30 that can form a top end of the shape-changing structure 40. As shown in FIG. 17, the top 30 comprises a central hub 32 from which extend multiple flexible mounting arms 34 that can each connect to the binary link $l_4$ of a prototype mechanism 10. A prototype top 30 was laser cut from a 1/16" thick sheet formed of the same polypropylene co-polymer.

Figure 18A:
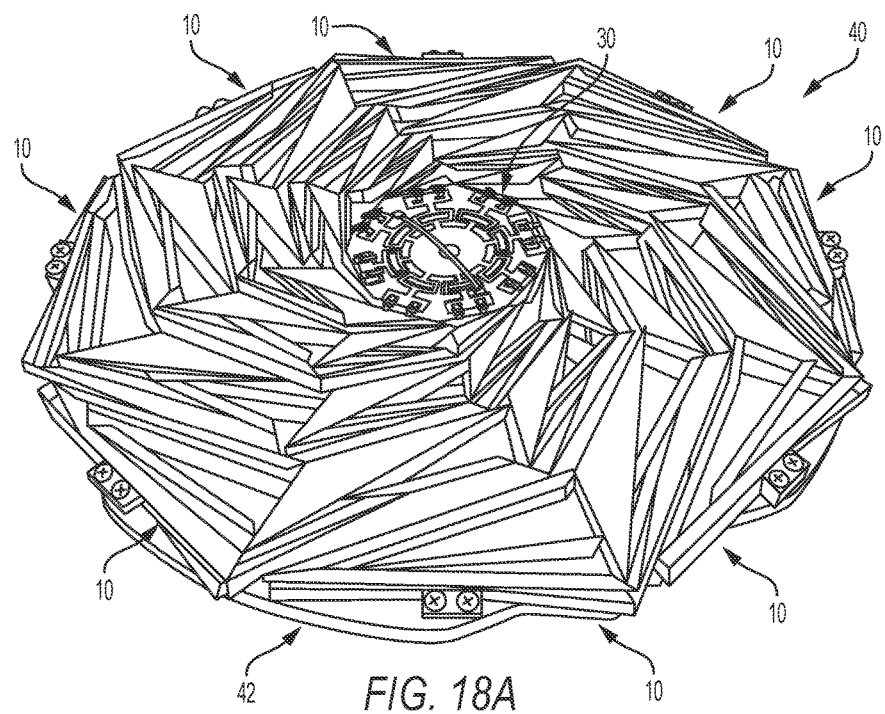
FIGS. 18A-18C depict an embodiment of a frustoconical, bistable, shape-changing structure in retracted and extended orientations.

FIG. 18 shows an embodiment of shape-changing structure 40 that was fabricated using eight prototype bistable collapsible compliant mechanisms 10, the prototype top 30, and a prototype base 42, which was also laser cut from a 1/16" thick sheet formed of the polypropylene co-polymer. As is most clear from FIG. 18A, the top end of each mechanism 10 was attached to the top 30 and the bottom ends of each mechanism was attached to the base 42.

Figures 18B, 18C:
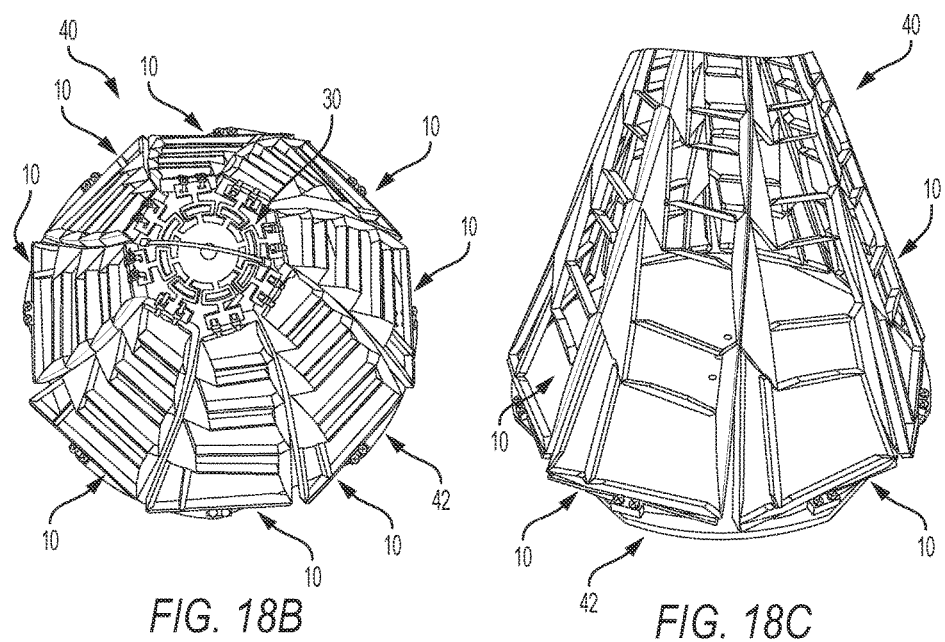

FIG. 18A shows the shape-changing structure 40 in a first, stable retracted orientation in which the structure is generally planar and each bistable collapsible compliant mechanism 10 generally lies in the same (horizontal) plane, which is generally parallel to the plane of the top surface of the base. FIGS. 18B and 18C show the structure 40 in a second, stable extended orientation in which the structure forms a frustum. As can be appreciated from these figures, the mechanisms 10 have been transitioned from the same-plane orientation shown in FIG. 18A to one in which they extend upward away from the base 42. This transitioning can be achieved by applying a suitable pulling (tensile) force to the top 30, base 40, or both so as to cause the top and base to separate from each other. As the distance between the top 30 and base 40 increases, the mechanisms 10 pivot about their twisting links 20 (FIGS. 15 and 16) to enable the structure 40 to extend upward. Notably, the structure 40 can be placed back in the retracted orientation of FIG. 18A by applying a suitable compressive force to the top 30, base 40, or both. As the structure 40 is stable in both the contracted and the expanded orientations, the structure may be described as a bistable shape-changing structure.

Comparing the mathematical model and the prototype from a geometry/dimensions point of view, the mathematical model focused on the height of the frustum where the prototype height was measured experimentally. The prototyped bistable collapsible compliant mechanisms 10 were fastened together to prevent out of plane movement and to prevent the interference of the elements that were believed to cause most of the error. Moreover, the prototype structure 40 lost some of height due to gravity, which caused it to sag. Thus, the comparison between the two methods was performed using the percentage error of the relative change between the height values as shown in Table 3.

TABLE 3

Comparison between the mathematical model and the prototype in height.

|  | Math.Model (mm) | Prototype (mm) | Error (%) |
|---|---|---|---|
| Height | 271.599 | 260 | 4.3 |

What is claimed is:

1. A bistable collapsible compliant mechanism comprising:
    a first sub-mechanism comprising opposed first and second quaternary links and multiple binary links, each link being connected to at least two other links in the first sub-mechanism with hinges; and
    a second sub-mechanism connected to the first sub-mechanism, the second sub-mechanism also comprising opposed first and second quaternary links and multiple binary links, each link being connected to at least two other links in second the sub-mechanism with hinges;
    wherein the bistable collapsible compliant mechanism is unitarily formed from a single piece of material and the hinges comprise flexible living hinges;
    wherein the bistable collapsible compliant mechanism can be alternatively be placed in a stable extended orientation in which the bistable collapsible compliant mechanism has a trapezoidal shape and in a stable contracted orientation in which the bistable collapsible compliant mechanism has a polygonal spiral shape.

2. The bistable collapsible compliant mechanism of claim 1, wherein the quaternary links of the first and second sub-mechanisms each comprise a quadrilateral link having four non-parallel sides and four corners.

3. The bistable collapsible compliant mechanism of claim 2, wherein the first and second sub-mechanisms each comprise a first binary link that connects to a top inner corner of the first quaternary link and to an top inner corner of the second quaternary link.

4. The bistable collapsible compliant mechanism of claim 3, wherein the first and second sub-mechanisms each comprise a second binary link that connects to a bottom inner corner of the first quaternary link and to a bottom inner corner of the second quaternary link.

5. The bistable collapsible compliant mechanism of claim 4, wherein the first sub-mechanism further comprises third and fourth binary links, the third binary link being connected to a bottom outer corner of the second quaternary link and a bottom end of the fourth binary link, and the fourth binary link being connected to a bottom outer corner of the first quaternary link.

6. The bistable collapsible compliant mechanism of claim 5, further comprising a bistability link that alternatively maintains the bistable collapsible compliant mechanism in the extended or retracted orientations.

7. The bistable collapsible compliant mechanism of claim 6, wherein the bistability link is connected to the third binary link and the first quaternary link.

8. The bistable collapsible compliant mechanism of claim 7, wherein the bistability link connects to the third binary link at a point between its ends and connects to the first quaternary link between its bottom outer corner and its bottom inner corner.

9. The bistable collapsible compliant mechanism of claim 1, further comprising a third sub-mechanism connected to the second sub-mechanism, the third sub-mechanism also comprising opposed first and second quaternary links and multiple binary links, each link being connected to at least two other links in the third sub-mechanism.

10. The bistable collapsible compliant mechanism of claim 9, wherein the second sub-mechanism is smaller than the first sub-mechanism and the third sub-mechanism is smaller than the second sub-mechanism.

11. A bistable collapsible compliant mechanism unitarily formed from a single piece of material, the mechanism comprising:
    a first sub-mechanism comprising opposed first and second quaternary links, a first binary link that connects to a top inner corner of the first quaternary link and to an top inner corner of the second quaternary link, a second binary link that connects to a bottom inner corner of the first quaternary link and to a bottom inner corner of the second quaternary link, and third and fourth binary links, the third binary link being connected to a bottom outer corner of the second quaternary link and a bottom end of the fourth binary link and the fourth binary link being connected to a bottom outer corner of the first quaternary link, each link being connected to the other links in the first sub-mechanism with a living hinge;
    a second sub-mechanism connected to the first sub-mechanism, the second sub-mechanism comprising opposed first and second quaternary links, a first binary link that connects to a top inner corner of the first quaternary link and to an top inner corner of the second quaternary link, and a second binary link that connects to a bottom inner corner of the first quaternary link and to a bottom inner corner of the second quaternary link, each link being connected to the other links in second the sub-mechanism with a living hinge, the second sub-mechanism being smaller than the first sub-mechanism;
    a third sub-mechanism connected to the second sub-mechanism, the third sub-mechanism comprising opposed first and second quaternary links, a first binary link that connects to a top inner corner of the first quaternary link and to an top inner corner of the second quaternary link, a second binary link that connects to a bottom inner corner of the first quaternary link and to a bottom inner corner of the second quaternary link, and third and fourth binary links, the third binary link being connected to a top outer corner of the first quaternary link and a top end of the fourth binary link, and the fourth binary link being connected to a top outer corner of the second quaternary link, each link being connected to the other links in the third sub-mechanism with a living hinge, the third sub-mechanism being smaller than the second sub-mechanism; and
    a bistability link that alternatively maintains the bistable collapsible compliant mechanism in a stable extended orientation in which the bistable collapsible compliant mechanism has a trapezoidal shape and in a stable contracted orientation in which the bistable collapsible compliant mechanism has a polygonal spiral shape.

12. The bistable collapsible compliant mechanism of claim 11, wherein the bistability link connects to the third binary link at a point between its ends and connects to the first quaternary link between its bottom outer corner and its bottom inner corner.

13. A shape-changing structure comprising:
multiple bistable collapsible compliant mechanisms, each mechanism comprising:
a first sub-mechanism comprising opposed first and second quaternary links and multiple binary links, each link being connected to at least two other links in the first sub-mechanism, and
a second sub-mechanism connected to the first sub-mechanism, the second sub-mechanism also comprising opposed first and second quaternary links and multiple binary links, each link being connected to at least two other links in the second sub-mechanism,
wherein the bistable collapsible compliant mechanism can be alternatively be placed in a stable extended orientation in which the bistable collapsible compliant mechanism has a trapezoidal shape and in a stable contracted orientation in which the bistable collapsible compliant mechanism has a polygonal spiral shape;
wherein the shape-changing structure can be alternatively placed in a stable extended orientation in which the structure has a frustoconical shape and in a stable contracted orientation in which the structure has a planar shape.

14. The structure of claim 13, wherein each bistable collapsible compliant mechanism further comprises a third sub-mechanism connected to the second sub-mechanism, the third sub-mechanism also comprising opposed first and second quaternary links and multiple binary links, each link being connected to at least two other links in the third sub-mechanism.

15. The structure of claim 13, wherein each bistable collapsible compliant mechanism is unitarily formed from a single piece of material and wherein the links of each bistable collapsible compliant mechanism connect to each other with flexible living hinges.

16. The structure of claim 13, wherein each bistable collapsible compliant mechanism comprises a bistability link that alternatively maintains the bistable collapsible compliant mechanism in the extended or retracted orientations.

17. The structure of claim 13, further comprising a base to which each bistable collapsible compliant mechanism is attached.

18. The structure of claim 17, further comprising a top to which each bistable collapsible compliant mechanism is attached.

* * * * *